United States Patent [19]

Reynolds

[11] Patent Number: 5,178,406
[45] Date of Patent: Jan. 12, 1993

[54] TORSION BAR SUSPENSION

[75] Inventor: Benjamin J. Reynolds, Newport, England

[73] Assignee: GKN Technology Limited, Wolverhampton, England

[21] Appl. No.: 743,364

[22] PCT Filed: Mar. 15, 1990

[86] PCT No.: PCT/GB90/00386

§ 371 Date: Aug. 16, 1991

§ 102(e) Date: Aug. 16, 1991

[87] PCT Pub. No.: WO90/11200

PCT Pub. Date: Oct. 4, 1990

[30] Foreign Application Priority Data

Mar. 17, 1989 [GB] United Kingdom ............ 8906229.3

[51] Int. Cl.[5] ............................................ B60G 21/055
[52] U.S. Cl. .................................... 280/723; 267/277
[58] Field of Search ............... 280/723, 689; 267/188, 267/183, 277, 273

[56] References Cited

U.S. PATENT DOCUMENTS

| 2,256,069 | 9/1941 | Wagner | 280/723 |
| 3,197,233 | 7/1965 | Van Winsen | 280/723 |
| 4,206,935 | 6/1988 | Sheppard et al. | 280/723 |

FOREIGN PATENT DOCUMENTS

| 0188289 | 7/1986 | European Pat. Off. |
| 2732786 | 2/1979 | Fed. Rep. of Germany |
| 2745387 | 4/1979 | Fed. Rep. of Germany |
| 89/04262 | 5/1989 | PCT Int'l Appl. |
| 2189751 | 11/1987 | United Kingdom |

Primary Examiner—Karin L. Tyson
Attorney, Agent, or Firm—Webb, Burden Ziesenheim & Webb

[57] ABSTRACT

A vehicle suspension system has an anti-roll portion bar arrangement comprising a torsion bar extending transversely of the vehicle, and first and second arms extending transversely from the torsion bar, one arm being connected to the torsion bar by a rotary actuator for moving the arm angularly about the torsion bar. The torsion bar is supported for angular movement about its torsional axis by a support member, for example, a tubular housing which is mounted to the vehicle structure by brackets which preferably extend lengthwise of the vehicle, forwardly or rearwardly, from the support member to be pivotally connected to the vehicle structure. As well as providing packaging benefits, the arrangement has the effect that the support member stores some energy in the system, lessening the demands on the properties of the torsion bar.

3 Claims, 2 Drawing Sheets

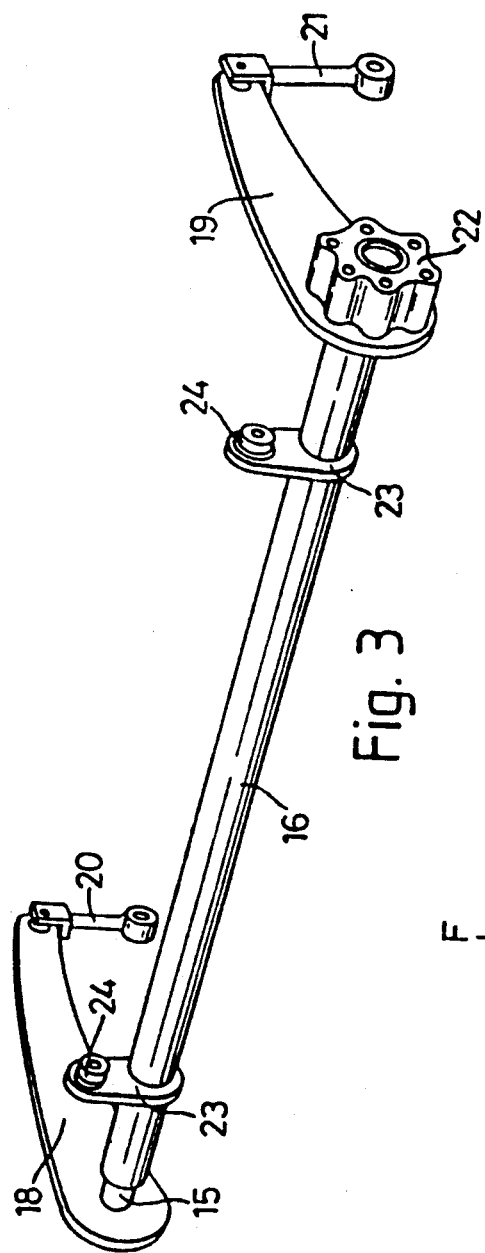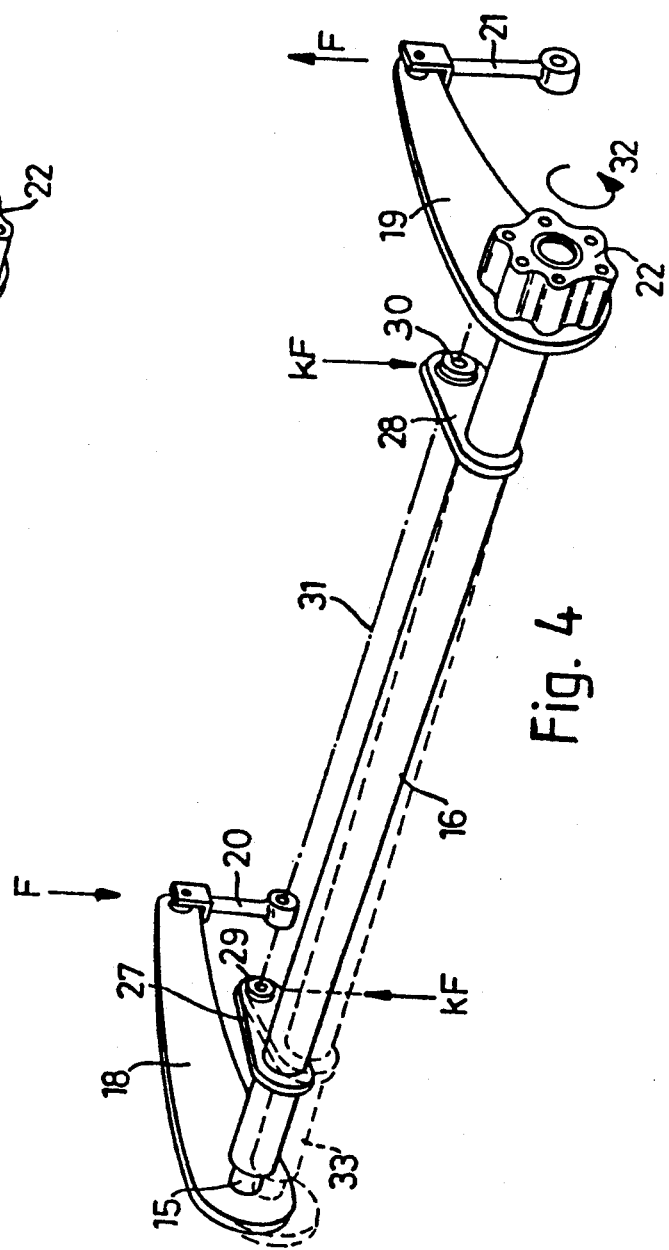

TORSION BAR SUSPENSION

BACKGROUND OF THE INVENTION

This invention relates to vehicle suspension systems. More particularly it relates to an anti-roll torsion bar arrangement for a vehicle suspension, wherein the anti-roll torsion bar is able to be torsionally loaded by an actuator so that, with suitable control of the actuator in response to a vehicle operating condition, roll of the vehicle can be reduced.

Examples of vehicle suspensions incorporating anti-roll torsion bar arrangements of the above types are disclosed in GB-2189751A and WO89/04262. One of the problems associated with a conventional passive anti-roll torsion bar, as has been widely used hitherto in vehicle suspensions, is that a torsion bar which is stiff enough to resist vehicle roll when cornering has a disadvantageous effect on the ride of the vehicle when it is not cornering, by restricting the ability of the vehicle suspension by opposite sides of the vehicle to operate independently. By loading the torsion bar in response to a vehicle operating condition, e.g. vehicle lateral acceleration as detected by a suitable sensor, the torsion bar can be made to resist roll when the vehicle corners without requiring the torsion bar to be so stiff as to disadvantageously affect the ride quality of the vehicle when it is not cornering. The actuator may, as disclosed in WO89/04262, load the torsion bar directly by applying a torsional input thereto at one end thereof.

One of the problems associated with such a torsion bar and actuator installation is that, if a torsion bar of low torsional stiffness (so as not to affect vehicle ride when not cornering) is to store sufficient energy effectively to resist vehicle roll during cornering, the actuator which torsionally loads the bar has to put a large torsional input into the bar. This in turn produces a problem in that high stresses in the torsion bar are generated, requiring the bar to be of a high performance, and hence expensive, material.

A further problem associated with such an anti-roll torsion bar installation is that known as "packaging", i.e. accommodating the torsion bar and associated components in the vehicle in a way which is generally convenient, taking account of factors such as the amount of space occupied by such components. At the same time, of course, there should be no disadvantage caused to the performance of the torsion bar arrangement.

Accordingly, it is the object of the present invention to provide an anti-roll torsion bar arrangement which overcomes or reduces at least one of the above mentioned problems, namely that of the required properties of the torsion bar and that of the packaging of the torsion bar arrangement.

SUMMARY OF THE INVENTION

According to the present invention we provide an anti-roll torsion bar arrangement for a vehicle suspension system, comprising a torsion bar adapted to extend transversely of the vehicle; a first arm fast with one end of the torsion bar to extend transversely of the torsion bar therefrom, the arm being adapted for connection to a movable suspension part of the vehicle at the adjacent side thereof; a second arm at the other end of the torsion bar to extend transversely of the torsion bar therefrom, the second arm being adapted for connection to a suspension part of the vehicle at the adjacent side thereof; an actuator operable to effect angular movement between said second arm and said other end of the torsion bar, about the torsional axis of the torsion bar; a support member for said torsion bar, extending lengthwise thereof and supporting the torsion bar for angular movement about its torsional axis, and mounting means for said support member, said mounting means comprising brackets secured to said support member and spaced from one another lengthwise of the support member, said brackets extending transversely of the support member and being adapted for connection to the vehicle structure for pivotal movement about an axis spaced from said support member and torsion bar.

The manner in which a torsion bar arrangement according to the invention is advantageous in packaging terms will hereafter be described in relation to the drawings.

Preferably the brackets extending transversely of the support member are arranged to extend longitudinally of the vehicle so that the axis about which they will be connected to the vehicle structure is spaced longitudinally of the vehicle (i.e. forwardly or rearwardly thereof) from the support member and torsion bar.

Preferably said support member is fast with said second arm at said other end of the torsion bar, in respect of angular movement about the torsional axis of the torsion bar.

As will be hereafter explained in relation to an embodiment of the invention, the effect of this preferred arrangement of the mounting brackets for the support member for the torsion bar is that, when the torsion bar is torsionally loaded by the actuator, the support member itself is torsionally loaded and stores some energy. Therefore, for a required resistance to roll of the vehicle, the torsion bar itself does not have to store so much energy as if no support member mounted according to the invention were provided. Therefore the above described problem relating to the properties of the torsion bar is reduced.

The support member may comprise a tubular member enclosing the torsion bar. Alternatively, the support member could be of channel section, partially enclosing the torsion bar.

The invention also provides a vehicle provided with an anti-roll torsion bar arrangement according to the invention as above set forth.

BRIEF DESCRIPTION OF THE DRAWINGS

The invention will now be described by way of example with reference to the accompanying drawings, of which:

FIG. 3 is a diagrammatic perspective view of a first embodiment of anti-roll torsion bar and associated components for a vehicle suspension system, according to the invention;

FIG. 4 is a diagrammatic perspective view of a further embodiment of anti-roll torsion bar according to the invention.

DESCRIPTION OF THE PREFERRED EMBODIMENTS

Figure 1:
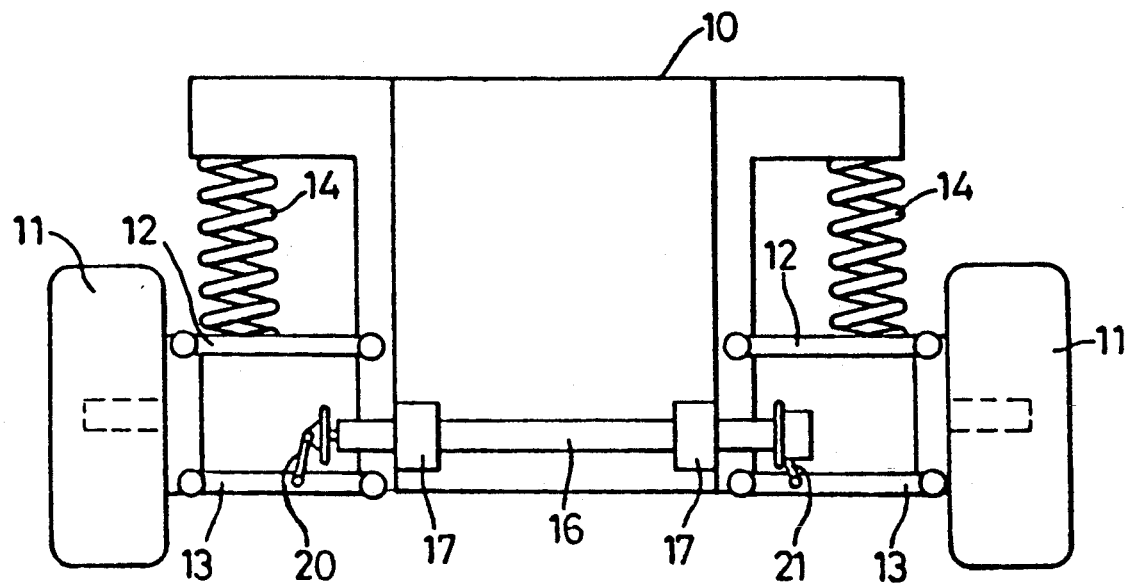
FIGS. 1 and 2 are respectively a diagrammatic elevation and a plan showing an example of a vehicle suspension provided with an anti-roll torsion bar arrangement.
Figure 2:
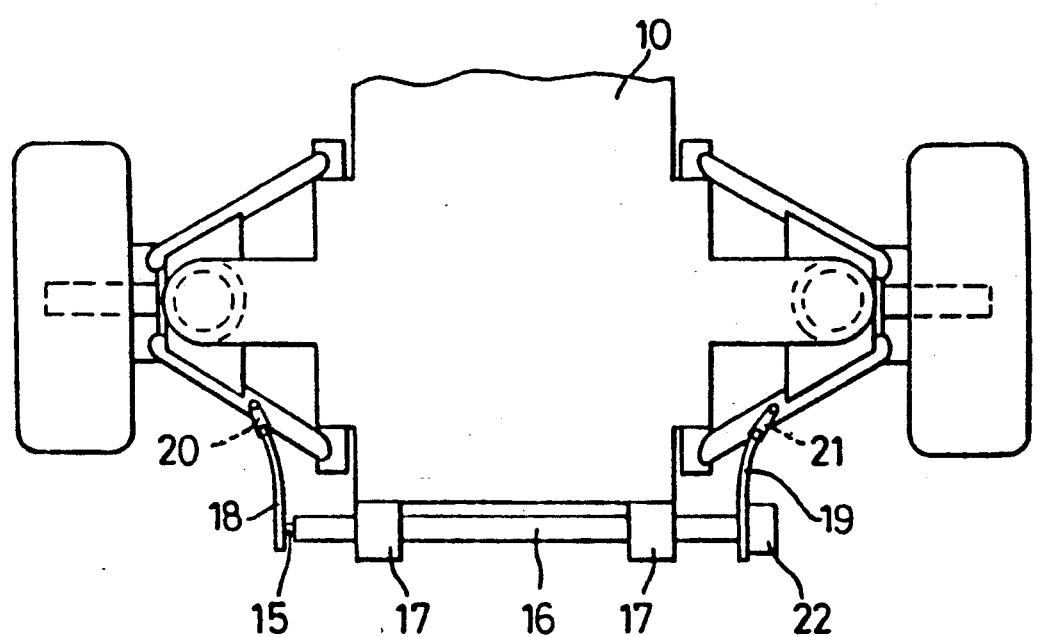

Referring firstly to FIGS. 1 and 2, these show diagrammatically a vehicle suspension including an anti-roll torsion bar arrangement. In these drawings, a vehicle chassis (which term as used herein includes an integral body-chassis structure) is indicated at 10. At each side, a wheel 11 is supported by pivoted upper (12) and lower (13) links. Springing is provided by springs 14 acting on upper links 12.

The anti-roll torsion bar arrangement comprises a torsion bar 15 extending transversely of the vehicle, the torsion bar being enclosed and supported for rotation in a tubular housing 16 connected to the vehicle chassis. The connection of the housing 16 to the chassis is by way of elastomeric bushings 17 which surround the housing 16, for reasons of noise and vibration isolation.

From each end of the torsion bar 15, respective arms 18, 19 extend transverse to the axis of the torsion bar and generally lengthwise of the vehicle. The ends of the arms 18, 19 remote from the torsion bar are connected to the lower wheel supporting links 13 by respective pivoted generally upright further links 20, 21. The arm 18 is fast with its end of the torsion bar 15, e.g. by a splined connection, while the connection between the arm 19 and the other end of the torsion bar 15 is by way of a rotary actuator 22 which is operable to effect relative angular movement between the arm 19 and the adjacent end of the torsion bar 15 about the longitudinal axis of the torsion bar. The housing 16 is connected fast with the arm 19, either directly or through the intermediary of a part of the actuator 22.

The actuator 22 may be a torsional hydraulic actuator or any other appropriate type of actuator, and would be controlled by a suitable control arrangement which does not form part of the present invention but which may, for example, be operable in the general manner disclosed in our International patent application Publication WO89/04262 aforesaid.

By virtue of the fact that they have to surround the tubular housing 16, the elastomeric mounts 17 by which the housing is secured to the vehicle chassis have to be relatively large and bulky components. In packaging terms, this represents a considerable disadvantage. Therefore, the present invention, in one embodiment, proposes that the torsion bar and associated components be arranged as shown in FIG. 3 of the drawings. In this drawing, the torsion bar 15, tubular housing 16, arms 18, 19, links 20, 21 and actuator 22 are shown as above described. In this case, however, the tubular housing 16 is provided with two upstanding brackets 23 which at their upper ends have bushes 24 providing for attachment thereof to the vehicle chassis, about an axis spaced vertically above the torsion bar, with the provision of suitable elastomeric elements for noise and vibration isolation. This arrangement is considerably more convenient than the provision of large mountings surrounding the tubular housing 16.

Preferably, however, the mounting arrangement of the torsion bar is such that the tubular housing 16 thereof is itself torsionally loaded when the torsion bar is so loaded, the support member thus storing energy itself. This effect is achieved by the arrangement shown in FIG. 4 of the drawings.

In the FIG. 4 embodiment, the torsion bar 15, tubular housing 16, arms 18, 19, links 20, 21, and actuator 22, are as shown in FIG. 3. In this case, however, the tubular housing 16 is provided with brackets 27, 28 which extend in the direction longitudinally of the vehicle, i.e. forwardly or rearwardly thereof. The ends of the brackets 27, 28 remote from the tubular housing 16 are pivotally secured to the vehicle chassis by mounting bushes 29, 30, for pivotal movement about an axis 31.

If, to resist roll of the vehicle when cornering, the actuator causes an angular movement as indicated by arrow 32 of the adjacent end of the torsion bar 15 relative to the arm 19, equal and opposite forces are caused to be exerted at the vehicle suspension through the links 20, 21 at the end of arms 18, 19. In terms of the forces exerted on the illustrated arrangement, forces F are exerted on the arms 18, 19 in the indicated directions. Corresponding equal and opposite forces kF (greater than forces F because of the inboard disposition of brackets 27, 28 compared with arms 18, 19) are reacted by the vehicle structure at the mounting bushes 29, 30 of the brackets 27, 28. These forces kF at the mounting brackets 27, 28 cause the tubular housing 16 itself to twist and displace vertically in the region of its mounting bracket 27, as shown in broken lines at 33. The net result is that instead of the total torsional input into the system by the actuator 22 appearing as torsion of the torsion bar 15, some appears as torsion of the support tube 16. In other words, the tubular housing 16 is responsible for part of the total energy stored by the system, hence lessening the demands on the properties of the torsion bar 15.

Instead of a support member in the form of tubular housing 16, a member of channel section, partially enclosing the torsion bar and having suitable bearings for rotation of the torsion bar, could be provided. If a tubular housing of reduced torsional stiffness were required, such a housing could be slotted lengthwise.

In the embodiment of FIG. 4, the connection of tubular housing 16 to the arm 19 so as to be fast therewith, in respect of angular movement about the axis of the housing and torsion bar, has the effect of constraining the housing against uncontrolled pivoting about its mounting bushes 29, 30. It would be possible for the housing to be angularly movable relative to the arm 19, in which case some other means would have to be provided to constrain the housing. Such means, e.g. a link connected to the housing midway between its ends, must not interfere with the ability of the housing to twist as shown in FIG. 4.

I claim:

1. A vehicle comprising a chassis, and a suspension system for a pair of wheels arranged one wheel at each side of the vehicle, the suspension system comprising respective movable suspension parts supporting the wheels at opposite sides of the vehicle for generally vertical movement relative to said chassis, and an anti-roll torsion bar arrangement comprising:

a torsion bar extending transversely of the vehicle;

a first arm fast with one end of the torsion bar to extend transversely of the torsion bar therefrom, the arm being connected to said respective movable suspension part at one side of the vehicle;

a second arm connected to the torsion bar at the other end of the torsion bar to extend transversely of the torsion bar therefrom, the second arm being connected to said respective movable suspension part at the other side of the vehicle;

an actuator operable to effect angular movement between said second arm and said other end of the torsion bar, about the torsional axis of the torsion bar;

a support member for said torsion bar extending lengthwise thereof and supporting the torsion bar for angular movement about its torsional axis; said support member comprising a member at least partially enclosing the torsion bar and mounting means for said support member, said mounting means comprising brackets rigidly secured to said support member and spaced from one another lengthwise of the support member, said brackets extending longitudinally of the vehicle and being connected to the vehicle chassis for pivotal movement about an axis spaced longitudinally of the vehicle from said support member and torsion bar.

2. A vehicle according to claim 1 wherein said support member is fast with said second arm at said other end of the torsion bar, in respect of angular movement about the torsional axis of the torsion bar.

3. A vehicle according to claim 1 wherein said support member comprising a tubular member enclosing the torsion bar.

* * * * *

UNITED STATES PATENT AND TRADEMARK OFFICE
CERTIFICATE OF CORRECTION

PATENT NO. : 5,178,406

DATED : January 12, 1993

INVENTOR(S) : Benjamin J. Reynolds

It is certified that error appears in the above-identified patent and that said Letters Patent is hereby corrected as shown below:

On title page, item [56] References Cited, U.S. PATENT DOCUMENTS
 "4,206,935 6/1988 Sheppard et al. 280/723" should read
 --4,206,935 6/1980 Sheppard et al. 280/723--.

Signed and Sealed this

Twenty-sixth Day of October, 1993

*Attest:*

BRUCE LEHMAN

*Attesting Officer*      *Commissioner of Patents and Trademarks*